United States Patent [19]
House

[11] 3,797,786
[45] Mar. 19, 1974

[54] WIND-FORCED WHEEL TURNER
[76] Inventor: Albert M. House, 1018 Brookline Ave., Louisville, Ky. 40215
[22] Filed: Apr. 7, 1972
[21] Appl. No.: 241,971

[52] U.S. Cl. ............................................ 244/103 S
[51] Int. Cl. ........................................... B64c 25/40
[58] Field of Search ..................... 244/103 S, 103 R

[56] References Cited
UNITED STATES PATENTS
2,389,525  11/1945  Manheim, Sr. ................ 244/103 S
2,777,651  1/1957  Gates ............................... 244/103 S FOREIGN PATENTS OR APPLICATIONS
912,891  8/1946  France ............................ 244/103 S Primary Examiner—George E. A. Halvosa
Assistant Examiner—Paul E. Sauberer

[57] ABSTRACT

An improvement in impeller type wheel turner for aircraft landing wheels utilizes an air stream deflector near the leading surface of the tire.

2 Claims, 3 Drawing Figures

PATENTED MAR 19 1974 3,797,786

WIND-FORCED WHEEL TURNER

This invention relates to aircraft, more particularly to its landing wheels.

A principal object of this invention is to provide a means for redirecting the air stream that normally breaks away and eddies along the leading edge of the wheels for great efficiency in impeller action.

Another object of this invention is to provide a means of the type described that does not interfere with other parts of the landing gear, is easy to install, can be shaped to look attractive on private aircraft and is low in cost.

These and other objects will be readily evident upon a study of the following specification and the accompanying drawing wherein.

Figure 2:
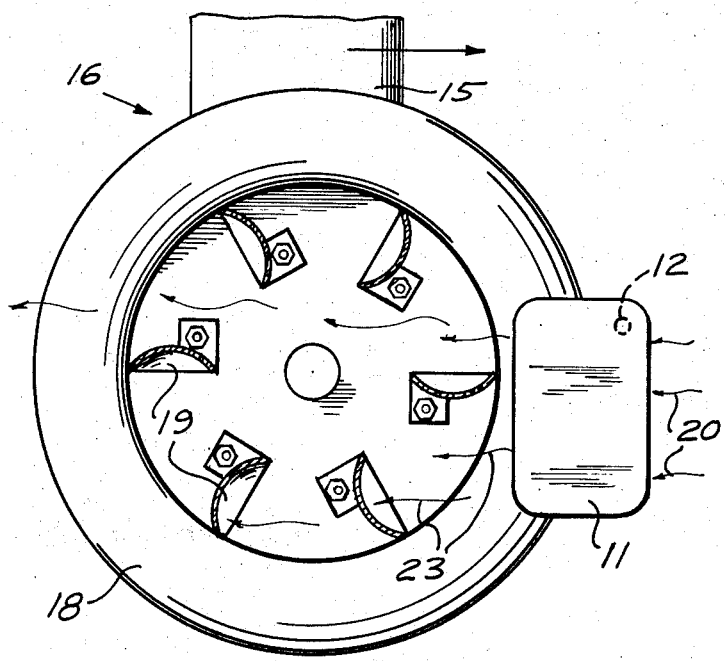
FIG. 2 is a side elevation section view of the invention illustrated in FIG. 1.
Figure 1:
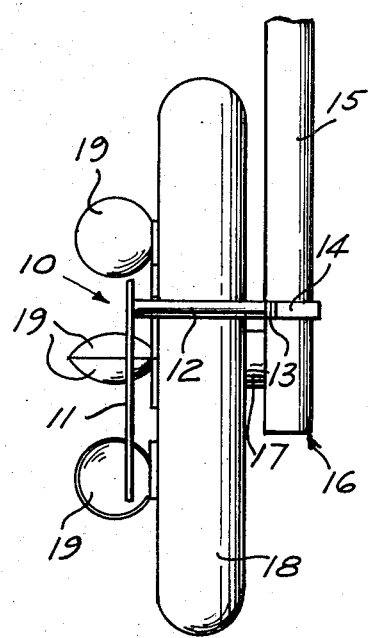
FIG. 1 is a front elevation view of the means, according to the invention shown installed on an aircraft landing gear.
Figure 3:
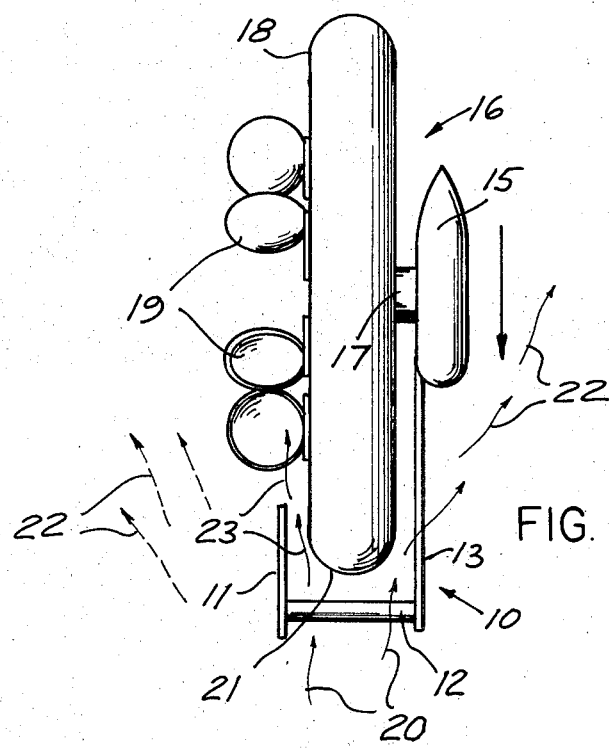
FIG. 3 is a plan view of FIG. 1.

Referring to the figures, the means 10 comprises a deflector plate 11, a transverse arm 12 an extension arm 13 and landing gear attachment clamp 14 assembled into one rigid unit as best seen in FIGS. 2 and 3.

By proper placement of clamp 14, by any means known in the art, on strut 15 of landing gear 16, or on another part of the landing gear fixed with respect to the wheel support 17, plate 11 will be positioned somewhat forward and to one side of wheel 18 provided with wheel-turning impellers 19.

Air stream 20, normally divides at the leading edge 21 of wheel 18 causing air flow in a VEE direction 22 with its accompanying eddies. The result is a loss of force air at impellers 19, giving poor spin and therefore greater tire wear.

With the placement of means 10, air stream 20 is redirected on the impeller side in flow 23, greatly increasing wheel spin with consequent improvement in tire life.

It should be noted that placement of plate 11 vertically is not even with the wheel centerline. By being positioned somewhat below the centerline, the airstream is not redirected to the upper impellers.

What I claim is:

1. For use with an aircraft wheel assembly for an aircraft landing gear comprising:
   A. a strut, an aircraft wheel and a wheel support on which said wheel is mounted;
   B. the combination therewith of an air actuating wheel rotating means which comprises:
      1. a series of air scoop impellers mounted on the side of said wheel;
      2. an airstream deflector means comprising a vertically disposed plate mounted toward the front and laterally of said wheel so as to lie in spaced and parallel relation to the side of said wheel for directing air into said impeller; and
      3. mounting means for said plate comprising:
         a. a transverse arm extending across the front of said wheel and attached to said plate;
         b. an extension arm attached to said transverse arm and extending along the medial edge of said wheel to said strut; and
         c. an attachment clamp for attachment of said extension arm to said strut.

2. The device, as defined in claim 1, in which said vertically disposed deflector plate is mounted so that the upper portion of said plate is in alignment with the horizontal centerline of said wheel and the lower portion of said plate depends below said horizontal centerline.

* * * * *